United States Patent [19]
Farone

[11] 3,963,657
[45] June 15, 1976

[54] CURABLE WATER-BASE COMPOSITIONS
[75] Inventor: Eugene Richard Farone, Mentor, Ohio
[73] Assignee: The Lubrizol Corporation, Cleveland, Ohio
[22] Filed: Oct. 10, 1974
[21] Appl. No.: 513,681

Related U.S. Application Data
[63] Continuation-in-part of Ser. No. 235,086, March 15, 1972, abandoned, which is a continuation-in-part of Ser. No. 210,130, Dec. 20, 1971, abandoned.

[52] U.S. Cl. .................... 260/29.4 UA; 260/72 R; 260/851; 260/853; 260/956; 526/12; 526/320
[51] Int. Cl.$^2$.......................................... C08L 61/20
[58] Field of Search ............. 260/29.4 R, 29.4 UA, 260/29.6 RB, 29.6 ME, 29.6 MN, 29.6 MQ, 37 N, 851

[56] References Cited
UNITED STATES PATENTS
3,518,326  6/1970  Forsberg ......................... 260/37 N
3,544,489  12/1970  Dowbenko ........................ 260/851
3,714,096  1/1973  Biale ........................... 260/29.4 UA Primary Examiner—Murray Tillman
Assistant Examiner—J. Ziegler
Attorney, Agent, or Firm—James W. Adams, Jr.; William H. Pittman

[57] ABSTRACT

Curable water-base compositions are prepared by combining a thermosetting acrylic polymer or an aminoplast composition with a water-soluble composition prepared by the reaction of an N-3-oxohydrocarbon-substituted acrylamide (preferably diacetone acrylamide) with an aldehyde (preferably formaldehyde) in the presence of an alkaline reagent. "Prepregs" can be prepared from filled water-base compositions of this type, preferably in aqueous solution with a free radical polymerization catalyst, with the water subsequently being removed by evaporation. Thermoset compositions are prepared by heating the curable prepregs for a time and at a temperature sufficient to effect free radical polymerization and crosslinking of the water-soluble composition. Water-base compositions containing pigments are useful as thermosetting paints, chiefly for metal surfaces, and may be thermoset in the same way.

22 Claims, No Drawings

CURABLE WATER-BASE COMPOSITIONS

This application is a continuation-in-part of copending application Ser. No. 235,086, filed Mar. 15, 1972, which in turn is a continuation-in-part of application Ser. No. 210,130, filed Dec. 20, 1971, both now abandoned.

This invention relates to new curable compositions of matter and thermoset resinous products prepared therefrom. More particularly, it relates to curable compositions of matter comprising (A) at least one thermosetting acrylic polymer or aminoplast composition and (B) a water-soluble substituted acrylamide composition as described hereinafter.

It is common practice in the plastics industry to impregnate a filler, which is usually a laminar reinforcing unit such as a glass fiber mat, paper, woven or nonwoven fabric, with a liquid, curable resin as a saturant or coating-forming material and to cure the composition thus produced under high temperature and/or pressure conditions to form a thermoset article. Among the types of articles which may be made in this way are molded structural units and laminates. One commonly used method in which resinous materials are used to make such articles is to form a "prepreg" by saturation of the reinforcing unit with the resinous material and subsequent treatment to produce a relatively dry and easy-to-handle unit. The prepreg may then be cured in contact with a surface to be adhered thereto, or a plurality of prepregs can be stacked to form a laminate which is then molded at a relatively high temperature, during which time crosslinking takes place and the thermoset final article is formed.

A number of resinous saturants are known in the art for use in the production of compositions of this type. They include unsaturated polyester resins in combination with crosslinking monomers, melamine-aldehyde resins, partially crosslinked acrylic resins and the like. Compositions prepared from these resins generally require the use of organic solvents which are volatile and flammable, and which are therefore somewhat dangerous to handle. The use of aqueous resin systems would be preferable by virtue of increased safety, but many of these resins are not soluble or dispersible in water and so it has been inconvenient or impossible to use aqueous systems in these operations.

It is also known to prepare coating compositions, in the nature of paints, by combining an organic or inorganic pigment with an aqueous polymer in solution in an organic solvent, or in the form of an aqueous latex. The organic solutions are especially useful for painting metal surfaces. They have a disadvantage, however, resulting from the fact that the solvent is flammable and volatile and therefore the paints are inherently somewhat dangerous to use. Latex paints have gained wide use for coating wood, plaster and the like, but they have been less useful for coating metal surfaces. Besides, the heterogeneity of the resin-water system which is subject to separation upon storage over long periods offers a disadvantage to the use of latex paints. These disadvantages could be avoided if a curable, homogeneous aqueous system were available, but few if any suitable systems of this type are known.

A principal object of the present invention, therefore, is to provide improved curable compositions.

A further object is to provide improved resinimpregnated filled articles.

A further object is to provide resin-impregnated laminar articles based on an aqueous system.

Another object is to prepare reinforced prepregs which are safe and easy to handle.

A still further object is to prepare thermoset reinforced plastic articles which may be used in a wide variety of applications.

A still further object is to provide a method for preparing filled resinous aggregates, including prepregs, and thermoset articles formed by curing thereof, which are based on a water system and which are easy and safe to handle in all stages of production.

Another object is to provide aqueous coating compositions which are homogeneous with respect to the film-forming ingredient.

Still another object is to provide curable clear or pigmented compositions suitable for forming coatings on metal surfaces.

A further object is to provide improved coated metal articles in which the coating material is obtained from a relatively homogeneous system.

Other objects will in part be obvious and will in part appear hereinafter.

As previously indicated, component A in the compositions of this invention is at least one thermosetting acrylic polymer or aminoplast composition. By the term "thermosetting acrylic polymer" is meant polymers based on acrylic acid, methacrylic acid and the corresponding esters, amides, nitriles and the like, which resins cure when heated to form an insoluble, infusible resin. They generally contain free hydroxy or epoxy groups. Illustrative thermosetting acrylic polymers are those containing units derived from such monomers as hydroxyalkyl acrylates and methacrylates, N-hydroxyalkylacrylamides such as N-methylolacrylamide, epoxyalkyl (e.g., glycidyl) acrylates and methacrylates, and the like.

As used herein, the term "aminoplast composition" means a thermosetting amine-aldehyde condensation product, which may be monomeric or polymeric. Exemplary of the aminoplast compositions that may be employed in this way are the urea formaldehydes, e.g., propylene urea formaldehyde or dimethylol urea formaldehyde; melamine formaldehydes (especially preferred), e.g., tetramethylolmelamine, pentamethylolmelamine, hexamethylolmelamine and melamineformaldehyde resins; ethylene ureas, e.g., dimethylol ethylene urea, dihydroxy-dimethylol ethylene urea, ethylene urea formaldehyde or hydroxyethylene urea formaldehyde; carbamates, e.g., alkyl carbamate formaldehydes; formaldehyde-acrolein condensation products; formaldehyde-acetone condensation products; alkylolamides, e.g., N-methylolformamide, N-methylolacetamide, N-methylolacrylamide, N-methylolmethacrylamide, N-methylol-N-methylacrylamide, N-methylolmethylene-bis-(acrylamide) or methylene-bis(N-methylolacrylamide); haloethyleneacrylamide; diureas, e.g., trimethylol acetylene diurea, tetramethylol acetylene diurea; triazone, e.g., dimethylol-N-ethyl triazone, N,N'-ethylene-bis(dimethylol) triazone and halo triazones; haloacetamides, e.g., N-methylol-N-methylchloroacetamide; urons, e.g., dimethylol uron or dihydroxy dimethylol uron; and the like. Also useful are derivatives of the above compounds wherein the methylol or other hydroxyalkyl groups therein are replaced by lower alkoxyalkyl groups (e.g., hexamethoxymethylmelamine), as well as analogous thioureas, thioamides and the like.

Component B in the compositions of this invention is a water-soluble composition which is generally prepared by reacting, in the presence of an alkaline reagent, an aliphatic aldehyde containing not more than 4 carbon atoms, or a reversible polymer thereof, with an N-3-oxohydrocarbon-substituted acrylamide having the formula

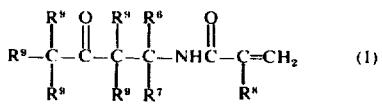

wherein each of $R^6$ and $R^7$ is hydrogen or a hydrocarbon or substituted hydrocarbon radical; $R^8$ is hydrogen, halogen or a lower alkyl or substituted lower alkyl radical; and each $R^9$ is individually hydrogen or a hydrocarbon or substituted hydrocarbon radical, at least one $R^9$ being hydrogen; said reaction being effected in a diluent comprising (1) water, or (2) an organic liquid which is a solvent for the reactants or the product or both, or (3) a mixture of diluents 1 and 2.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such forms are included.

| | |
|---|---|
| Methyl | Phenyl |
| Ethyl | Tolyl |
| Propyl | Xylyl |
| Butyl | Benzyl |
| Hexyl | Cyclohexyl |
| Octyl | Cyclopentyl |
| Decyl | Methylcyclopentyl |
| Vinyl | Cyclopentadienyl |
| Allyl | Vinylphenyl |
| Ethynyl | Isopropenylphenyl |
| Propargyl | Cinnamyl |
| Naphthyl | |
| —C₆H₃(C₂H₅)₂ | |
| —C₆H₄(CH₂)₁₁CH₃ | |

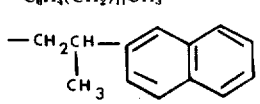

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Examples are:

Halide (fluoride, chloride, bromide, iodide)
Ether (especially lower alkoxy)
Keto
Carboxy
Ester (especially lower carbalkoxy)
Aminoacyl (amide)
Nitro
Cyano
Thioether
Sulfoxy
Sulfone In general, no more than about three such substituent groups will be present for each 10 carbon atoms in the radical.

Usually the hydrocarbon or substituted hydrocarbon radicals in the substituted acrylamide used for the preparation of component B are free from ethylenic and acetylenic unsaturation and have no more than about 30 carbon atoms, desirably no more than about 12 carbon atoms. They are preferably lower hyrocarbon radicals, the word "lower" denoting radicals containing up to seven carbon atoms. A particular preference is expressed for lower alkyl or aryl radicals, especially alkyl.

For preparation of the especially preferred compositions for use as component B, $R^6$ and $R^7$ are lower alkyl radicals; $R^8$ is hydrogen or methyl; and from one to three and preferably all five of the $R^9$ radicals in the N-3-oxohydrocarbon-substituted acrylamide reagent are hydrogen. Suitable N-3-oxohydrocarbon-substituted acrylamides are disclosed in U.S. Pat. Nos. 3,277,056 and 3,425,942, the disclosures of which are hereby incorporated by reference in this specification; examples are N-(1,1-dimethyl-3-oxobutyl)acrylamide, hereinafter referred to as diacetone acrylamide, and N-(1,3-diphenyl-1-methyl-3-oxopropyl)-acrylamide, hereinafter referred to as diacetophenone acrylamide. Because diacetone acrylamide is preferred and is most readily available, it will frequently be referred to in this specification. However, it is to be understood that other N-3-oxohydrocarbon-substituted acrylamides may be substituted for diacetone acrylamide.

Aldehydes which may be reacted with diacetone acrylamide to form component B include formaldehyde, acetaldehyde, propionaldehyde and the butyraldehydes. Of these, formaldehyde is preferred. Reversible polymers of the aldehydes (e.g., paraformaldehyde, trioxane, paraldehyde) may be used in place of the monomeric aldehydes and are considered equivalents thereof.

Alkaline reagents suitable for use include sodium hydroxide, potassium hydroxide, alkaline earth metal hydroxides, sodium methoxide, quaternary ammonium hydroxides and the like. The proportion of alkaline reagent should, in general, not exceed about 5 mole percent of the aldehyde used and usually need not be greater than about 1.5 mole percent thereof. While larger amounts may sometimes be employed, the use of such larger amounts is unnecessary and requires very close control of the reaction (e.g., through use of an alcohol solvent or cautious incremental addition of the alkaline reagent, as described hereinafter) to avoid formation of a water-insoluble polymeric product as discussed hereinafter.

The reaction temperature is not critical, so long as it is not high enough to cause decomposition of the reactants or product or condensation to a water-insoluble product. Temperatures below about 100°C, preferably about 40°–90°C., are preferred. Likewise, the molar ratio of aldehyde to diacetone acrylamide is not critical. This ratio is usually between about 1:1 and 8:1, preferably between 1:1 and 4:1. In some instances the presence of a polymerization inhibitor such as hydroquinone, hydroquinone monomethyl ether or a hindered phenol may be beneficial.

As previously mentioned, the reaction is carried out in a diluent comprising (1) water, or (2) an organic liquid which is a solvent for the reactants or the product or both, or (3) a mixture of diluents 1 and 2. Suitable organic diluents include alcohols, especially lower alkanols such as methanol, ethanol, n-butanol, isobutanol and the like; ethers and ether alcohols such as di-n-butyl ether, ethylene glycol monomethyl ether, ethylene glycol dimethyl ether, diethylene glycol monomethyl ether, dioxane and the like; and aromatic hydrocarbons such as benzene, toluene and xylene. The lower alkanols are particularly preferred by reason of the fact that they serve as solvents for both the reactants and the products. The same is true of water, and in the particularly preferred method for producing component B, water alone is the diluent.

The water-soluble compositions produced as described above are not simple chemical compounds, and they can be completely defined only in terms of the method for their preparation. However, a fair amount of information about the structure of these products has been obtained by various analytical procedures including elemental analysis, infrared and nuclear magnetic resonance spectroscopy, and gel permeation chromatography. These procedures, when applied to the condensation product of diacetone acrylamide with formaldehyde or paraformaldehyde, show that the principal constituents thereof are: (1) first, hydroxyalkyl compounds of the formula

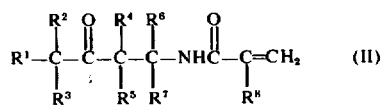

wherein each of $R^1$, $R^2$, $R^3$, $R^4$ and $R^5$ is hydrogen, a hydrocarbon or substituted hydrocarbon radical, or a hydroxyalkyl radical having not more than 4 carbon atoms, at least one and preferably from one to four of said radicals being hydroxyalkyl radicals and the remainder thereof preferably being hydrogen, and $R^6$, $R^7$ and $R^8$ are as previously defined, these hydroxyalkyl compounds being the predominant chemical species; and second, when an alcohol is used as a diluent, analogous compounds containing alkoxyalkyl (preferably lower alkoxyalkyl) radicals in place of one or more (usually one or two) of said hydroxyalkyl radicals; and (2) water-soluble condensation dimers and trimers of said compounds, which are apparently formed by condensation of the hydroxyalkyl and alkoxyalkyl compounds of formula II through ether or methylene linkages.

In general, component B consists essentially of the above-described compounds; that is, said compounds are the only ones present which materially affect or contribute to the properties thereof. Component B may also sometimes contain small amounts of higher condensation oligomers.

It is usually found that component B also contains measurable amounts of diacetone acrylamide (or other compounds of formula I used as reactants), since it is difficult to force the hydroxyalkylation reaction to completion. The diacetone acrylamide may be present in amounts up to about 50% by weight of the saturant, but it generally comprises less than about 20% by weight thereof. The presence of diacetone acrylamide is not detrimental, but at the same time it does not appear to be beneficial since diacetone acrylamide merely functions as a diluent. Therefore, the percentage thereof is preferably kept as low as possible.

Likewise, the presence of alkoxy derivatives and condensation dimers and trimers, especially the latter, is not harmful; in fact, such materials frequently improve the curing properties of the compositions of this invention. However, if the reaction between diacetone acrylamide and the aldehyde is allowed to proceed too fast (especially in the presence of relatively large amounts of alkaline reagent, as mentioned hereinabove), condensation of the hydroxyalkyl compounds may get out of control and the product may contain substantial or major proportions of a water-insoluble thermosetting resin of the type disclosed and claimed in applications Ser. No. 619,565, filed Mar. 1, 1967 (now abandoned); Ser. No. 793,168, filed Jan. 22, 1969 (now abandoned); Ser. No. 826,006, filed May 19, 1969 (now U.S. Pat. No. 3,518,326); and Ser. No. 79,716, filed Oct. 9, 1970.

There are a number of ways to control the reaction so as to avoid formation of the water-soluble resin. One is through the use of an alcohol as solvent; apparently under such conditions the formation of alkoxyalkyl derivatives is favored and such derivatives undergo condensation less easily than the hydroxyalkyl compounds. A second is through incremental addition of the alkaline reagent over a prolonged period. When such incremental addition is employed, the pH of the mixture rises to about 10-11 after the addition of an increment of alkali but then gradually drops to about 7-8. It is believed that this is caused by a Cannizzaro-type reaction between excess alkali and excess formaldehyde to produce an alkali metal formate.

The method described above produces a solution or suspension of component B in water or an organic diluent, usually a solution in water or an alcohol. It is possible to isolate the active material by removal of the diluent, which should be done cautiously and at relatively low temperatures (e.g., by vacuum evaporation or spray drying) to avoid condensation to a water-insoluble product as previously described. In the same way, component B may be concentrated by removal of a portion of the diluent, or a higher-boiling diluent may be added and the lower-boiling one removed by evaporation. However, such procedures are usually unnecessary since component B is conveniently used in the aqueous system in which it is prepared.

The preparation of compositions suitable for use as component B in the compositions of this invention is illustrated by the following examples. All parts and percentages are by weight unless otherwise indicated.

EXAMPLE 1

A solution of 338 parts (2 moles) of diacetone acrylamide in 1000 parts of water is heated to 50°C. and 45 parts of a 3% aqueous solution of trisodium phosphate is added. Dropwise addition of a 37% aqueous solution of formaldehyde is then begun and is continued for one hour, a total of 650 grams (8 moles of formaldehyde) being added. During the formaldehyde addition, three further portions of trisodium phosphate solution, one of 14 parts and two of 15 parts, are added. Heating is continued for five hours after formaldehyde addition is complete, and during that time additional increments of trisodium phosphate solution are added, care being taken that the pH of the mixture never increases above 10, until a total of 299 parts have been introduced (0.16 mole, or 2.0 mole percent based on formaldehyde).

The solution is cooled and filtered, and volatile materials are removed by heating under vacuum at 55°C. The product is a 61% aqueous solution of the desired watersoluble composition.

EXAMPLE 2

Following the procedure of Example 1, a similar reaction product is prepared from diacetone acrylamide and acetaldehyde.

EXAMPLE 3

Following the procedure of Example 1, a similar reaction product is prepared from diacetone acrylamide and n-butyraldehyde.

EXAMPLE 4

A solution of 280 parts (1.66 moles) of diacetone acrylamide in 296 parts of distilled water is heated to 33°C., and 164 parts of paraformaldehyde (5 moles based on monomeric formaldehyde) is added over 20 minutes. The solution is then heated to 47°C. and 8.3 parts of a 10% aqueous solution of potassium hydroxide is added over 10 minutes. The reaction mixture is stirred and heated to 52°C. over about one-half hour, at which time an exothermic reaction begins; stirring is continued and the temperature is kept at about 50°C. by passing cooling water through a jacket on the reaction vessel. At the end of the two-hour stirring period, an additional 8.3 parts of the potassium hydroxide solution is added, and a final 8.3 parts is added after a further two-hour stirring period (total 0.9 mole percent based on formaldehyde). The mixture is stirred for an additional 2 hours, cooled to 24°C. and filtered. The product, a 55 % aqueous solution of the desired water-soluble composition, contains 3.04% nitrogen.

EXAMPLE 5

To a solution of 644 parts (3.81 moles) of diacetone acrylamide in 681 parts of water, at 31°C., is added, with stirring, 372 parts of paraformaldehyde (11.3 moles based on monomeric formaldehyde). The mixture is heated to 43°C. and 19 parts of a 10% aqueous solution of potassium hydroxide is added. The mixture is further heated, with stirring, to 48°–55°C. and maintained at this temperature for 2 hours. An additional 19 parts of potassium hydroxide solution is then added and stirring is continued for 2 hours, followed by addition of a third 19-ml. portion of potassium hydroxide solution (total 0.87 mole percent based on formaldehyde) and stirring for 2 more hours. The solution is then cooled to 29°C., 0.044 part of methylhydroquinone is added and the mixture is filtered. The product, a 53% aqueous solution of the desired water-soluble composition, contains 3.04% nitrogen.

EXAMPLE 6

A portion of the product of Example 5 (1500 parts) is heated at 50°–55°C./70 torr for 8½ hours, during which time 469 parts of water is removed by distillation. The product is an 80% aqueous solution of the desired water-soluble composition.

EXAMPLE 7

A mixture of 400 parts of the product of Example 5 and 220 parts of ethylene glycol monomethyl ether is heated at 58°–72°C./102 torr until 309 parts of volatile material has been removed by distillation. The residue is an approximately 71% solution of the desired water-soluble composition in ethylene glycol monomethyl ether.

EXAMPLE 8

A mixture of 1352 parts (8 moles) of diacetone acrylamide, 1136 parts of methanol and 480 parts of a solution comprising 55% formaldehyde (8.8 moles of formaldehyde), 35% methanol and 10% water is heated to 44°C., and 10 parts of a 10% solution of potassium hydroxide in methanol (0.2 mole percent of potassium hydroxide based on formaldehyde) is added. The mixture is heated at 44°–47°C. for 7 hours with stirring, and is then stripped of volatile materials by distillation at 48°C./4 torr. The water-soluble product contains 7.08% nitrogen.

EXAMPLE 9

Following the procedure of Example 8, a water-soluble product containing 6.16% nitrogen is obtained from 1014 parts (6 moles) of diacetone acrylamide, 1706 parts of methanol, 491 parts (9.0 moles of formaldehyde) of formaldehyde-methanol-water solution, and 10 parts of methanolic potassium hydroxide (0.2 mole percent potassium hydroxide based on formaldehyde).

EXAMPLE 10

Following the procedure of Example 8, a water-soluble product containing 6.38% nitrogen is obtained from 1014 parts (6 moles) of diacetone acrylamide, 1767 parts of methanol, 654 parts (12 moles of formaldehyde) of formaldehyde-methanol-water solution, and 10 parts of methanolic potassium hydroxide (0.15 mole percent potassium hydroxide based on formaldehyde).

EXAMPLE 11

A mixture of 1014 parts (6 moles) of diacetone acrylamide, 1890 parts of methanol, 981 parts (18 moles of formaldehyde) of the formaldehyde-methanol-water solution of Example 8 and 10 parts of a 10% solution of potassium hydroxide in methanol is heated to 50°C., with stirring, for about 3 hours. An additional portion of 10 parts of methanolic potassium hydroxide is added and heating and stirring are continued for 4 hours. A third portion of methanolic potassium hydroxide is then added (total 0.3 mole percent potassium hydroxide based on formaldehyde). Heating and stirring are continued for 4 hours, and then the solution is cooled and stripped of volatile materials by vacuum distillation as in Example 8. The water-soluble product contains 5.65% nitrogen.

EXAMPLE 12

A water-soluble product prepared by the method of Example 11 is freed of potassium ions by contact with a cation exchange resin. The resulting solution is stripped of volatile materials by vacuum distillation to obtain a 90% solution of the desired product.

EXAMPLE 13

The procedure of Example 11 is repeated except that the diacetone acrylamide is replaced, on an equimolar basis, by diacetophenone acrylamide. A similar product is obtained.

EXAMPLE 14

Following the procedure of Example 11, a product is prepared from 2028 parts (12 moles) of diacetone acrylamide, 3482 parts of methanol, 1964 parts (36 moles of formaldehyde) of the formaldehyde-methanol-water solution, and 360 parts of methanolic potassium hydroxide. The product is neutralized with phosphoric acid to a pH of 6.45 and stripped of volatile materials under vacuum. The neutralized and stripped water-soluble product contains 5.03% nitrogen.

EXAMPLE 15

A mixture of 1268 parts (7.5 moles) of diacetone acrylamide, 1635 parts (30 moles of formaldehyde) of the formaldehyde-methanol-water solution of Example 8, and 15.8 parts of a 10% solution of potassium hydroxide in methanol (0.09 mole percent potassium hydroxide based on formaldehyde) is heated at 40°–50°C. for 5 hours, after which time volatile materials are removed by vacuum distillation. The water-soluble product contains 5.33% nitrogen.

EXAMPLE 16

Following the procedure of Example 4, a water-soluble product is prepared from a mixture having a 1:5 mole ratio of diacetone acrylamide to formaldehyde. The resulting product is stripped of volatile materials by distillation at 50°–55°C./60 torr to obtain a concentrated product containing only 20% water.

The compositions of this invention generally comprise about 5–50% by weight, preferably about 5–25%, of component A with the balance being component B. Preferably, the composition also includes a free radical polymerization catalyst, such as benzoyl peroxide, t-butyl perbenzoate, cumyl hydroperoxide, potassium peroxydiphosphate or the like, although it is also within the scope of this invention to omit the catalyst and to initiate polymerization when appropriate by irradiation. There may also be incorporated inhibitors, flame retardants, mold release agents, and other known additives.

The compositions of this invention may also contain fillers and/or pigments. As fillers, there may be used any of the materials known in the art for such use. These include laminar reinforcing units (which are preferred), i.e., glass fiber mats, kraft or decorative paper, woven and non-woven fabrics, etc., as well as particulate materials such as cotton flock, cellulose flock, wood flour, asbestos fiber, random glass fiber, asbestos shorts, Asbestine, cellulose and slate flour. Other suitable fillers will be readily apparent to those skilled in the art. The only requirement is that the filler not inhibit polymerization and curing of the composition under the conditions of preparation and use thereof.

Filled compositions of this invention are usually prepared by saturating the filler by known methods, such as immersion, with an aqueous solution, either concentrated or dilute, of the combination of component A, component B and whatever other additives may be appropriate, said combination being referred to hereinafter as the "saturant". Following saturation the aggregate is usually freed of excess saturant by means of squeeze rolls, doctor blades or the like. Volatile materials are then removed by heating at a temperature and for a time sufficient to evaporate the same but insufficient to cause substantial polymerization or crosslinking of the composition. Generally, a temperature of about 90°–120°C. is suitable and the drying time is usually no more than about 15 minutes. The resulting prepreg may contain about 10–90% of the composition of this invention, with the balance being filler and traces of remaining volatiles.

The prepregs prepared according to the abovedescribed method may be used to form laminates by stacking several of such prepregs, either alone or with prepregs containing other saturants such as unsaturated polyestercrosslinking monomer mixtures, melamine-aldehyde resins or the like. Depending on the filler, they may also be used as glue-on decorative laminates for coating plywood or other solid materials. Thus, it will be appreciated that the prepregs may be used as both structural and decorative units. These prepregs are substantially non-blocking and, depending upon the filler used, may be flexible.

The prepregs or laminates may be cured by heating at a temperature and for a period of time sufficient to effect free radical polymerization and crosslinking of component B. Free radical polymerization is catalyzed by the polymerization catalyst present therein, or it may be initiated externally by irradiation as previously mentioned. The temperature required for such polymerization is generally above that required for removal of volatile matter from the prepreg, with temperatures of about 125°–200°C. generally being suitable. Simultaneously with free radical polymerization, crosslinking (probably involving the hydroxy groups in component B) takes place resulting in the formation of a thermoset article.

In the following table are listed typical compositions of this invention.

| Examples | Parts by weight | | |
|---|---|---|---|
| | 17 | 18 | 19 |
| Product of Example 5 | 2730 | 2730 | 1820 |
| "Rhoplex AC-201" thermosetting acrylic latex (46% solids) | 326 | — | — |
| Thermosetting interpolymer latex of butyl acrylate, ethyl acrylate, acrylonitrile, acrylic acid and N-methylolacrylamide (48% solids) | — | 626 | — |
| "Cymel 405" melamine-formaldehyde resin (50% soln. in isopropanol-water) | — | — | 300 |
| t-Butyl perbenzoate | 45 | 45 | 30 |

Prepregs may be produced from the compositions of Examples 1719, for example, by pulling kraft paper (No. 99) through a bath containing said composition at a rate of 1.8 feet per minute and subsequently drying by passing through an oven at 113°C. A stack of 6 (for example) plies of the resulting prepreg may be prepared, wrapped in polyethylene and placed between two aluminum plates and a 5-kilogram weight is placed thereon. After storage for 4 days at 49°C., the prepregs remain non-blocking.

Two plies of the prepreg are molded for 5 minutes at 150°C. and 200 psi. A thermosetting laminate is obtained with excellent appearance and solvent resistance.

What is claimed is:

1. A curable composition comprising (A) at least one thermosetting acrylic polymer or aminoplast composition and (B) a water-soluble composition of matter consisting essentially of:

1. compounds of the formula $$R^1-\underset{R^3}{\underset{|}{C}}-\underset{}{\overset{O}{\underset{\|}{C}}}-\underset{R^5}{\underset{|}{\overset{R^4}{\underset{|}{C}}}}-\underset{R^7}{\underset{|}{\overset{R^4}{\underset{|}{C}}}}-NH\overset{O}{\underset{\|}{C}}-\underset{R^8}{\overset{}{C}}=CH_2$$

wherein each of $R^1$, $R^2$, $R^3$, $R^4$ and $R^5$ is hydrogen, a hydrocarbon radical, a substituted hydrocarbon radical wherein the substituents are halide, ether, keto, carboxy, ester, amide, nitro, cyano, thioether, sulfoxy or sulfone groups, a hydroxyalkyl radical having not more than 4 carbon atoms, or an alkoxy derivative of said hydroxyalkyl radical, at least one of $R^1$, $R^2$, $R^3$, $R^4$ and $R^5$ being a hydroxyalkyl radical of alkoxy derivative thereof; each of $R^6$ and $R^7$ is hydrogen, a hydrocarbon radical or a substituted hydrocarbon radical wherein the substituents are selected from those listed hereinabove; and $R^8$ is hydrogen, halogen, a lower alkyl radical or a substituted lower alkyl radical wherein the substituents are selected from those listed hereinabove; and 2. condensation dimers and trimers of said compounds.

2. A composition according to claim 1 wherein from one to four of $R^1 R^2$, $R^3$, $R^4$ and $R^5$ are hydroxymethyl radicals and the remainder thereof are hydrogen atoms, $R^6$ and $R^7$ are lower alkyl radicals and $R^8$ is hydrogen or methyl.

3. A composition according to claim 2 which also contains a filler.

4. A composition according to claim 3 wherein $R^6$ and $R^7$ are methyl and $R^8$ is hydrogen.

5. A composition according to claim 4 wherein component B additionally contains, as a diluent, up to about 20% diacetone acrylamide.

6. A composition according to claim 5 which also contains a free radical polymerization catalyst.

7. A composition according to claim 6 wherein component A is a thermosetting acrylic polymer.

8. A composition according to claim 6 wherein component A is a melamine-formaldehyde resin.

9. A composition according to claim 2 which also contains a pigment.

10. A composition according to claim 9 wherein $R^6$ and $R^7$ are methyl and $R^8$ is hydrogen.

11. A composition according to claim 10 wherein component B additionally contains, as a diluent, up to about 20% diacetone acrylamide.

12. A composition according to claim 11 which also contains a free radical polymerization catalyst.

13. A composition according to claim 12 wherein component A is a thermosetting acrylic polymer.

14. A composition according to claim 12 wherein component A is a melamine-formaldehyde resin.

15. A thermoset composition prepared by heating the composition of claim 3 at a temperature and for a period of time sufficient to effect free radical polymerization and crosslinking thereof.

16. A thermoset composition prepared by heating the composition of claim 6 at a temperature and for a period of time sufficient to effect free radical polymerization and crosslinking thereof.

17. A thermoset composition prepared by heating the composition of claim 7 at a temperature and for a period of time sufficient to effect free radical polymerization and crosslinking thereof.

18. A thermoset composition prepared by heating the composition of claim 8 at a temperature and for a period of time sufficient to effect free radical polymerization and crosslinking thereof.

19. A coated article prepared by coating the surface of said article with a composition according to claim 9 and subsequently heating the article thus obtained at a temperature and for a period of time sufficient to effect free radical polymerization and crosslinking thereof.

20. A coated article prepared by coating the surface of said article with a composition according to claim 12 and subsequently heating the article thus obtained at a temperature and for a period of time sufficient to effect free radical polymerization and crosslinking thereof.

21. A coated article prepared by coating the surface of said article with a composition according to claim 13 and subsequently heating the article thus obtained at a temperature and for a period of time sufficient to effect free radical polymerization and crosslinking thereof.

22. A coated article prepared by coating the surface of said article with a composition according to claim 14 and subsequently heating the article thus obtained at a temperature and for a period of time sufficient to effect free radical polymerization and crosslinking thereof.

* * * * *

UNITED STATES PATENT AND TRADEMARK OFFICE
CERTIFICATE OF CORRECTION

PATENT NO. : 3,963,657

DATED : June 15, 1976

INVENTOR(S) : Eugene Richard Farone

It is certified that error appears in the above—identified patent and that said Letters Patent are hereby corrected as shown below:

Column 11, line 27, "of" should read --or--; line 38, a comma should appear between "$R^1$" and "$R^2$".

Signed and Sealed this

Twenty-eighth Day of December 1976

[SEAL]

Attest:

RUTH C. MASON
*Attesting Officer*

C. MARSHALL DANN
*Commissioner of Patents and Trademarks*